July 25, 1944. F. L. AYRES 2,354,297

FASTENING MEANS FOR DETACHABLE COVERS AND OTHER DEVICES

Filed April 2, 1942 4 Sheets-Sheet 1

Inventor:
Francis Lawrence Ayres
By Williams, Bradbury & Hinkle
Attys.

July 25, 1944. F. L. AYRES 2,354,297
FASTENING MEANS FOR DETACHABLE COVERS AND OTHER DEVICES
Filed April 2, 1942 4 Sheets-Sheet 2
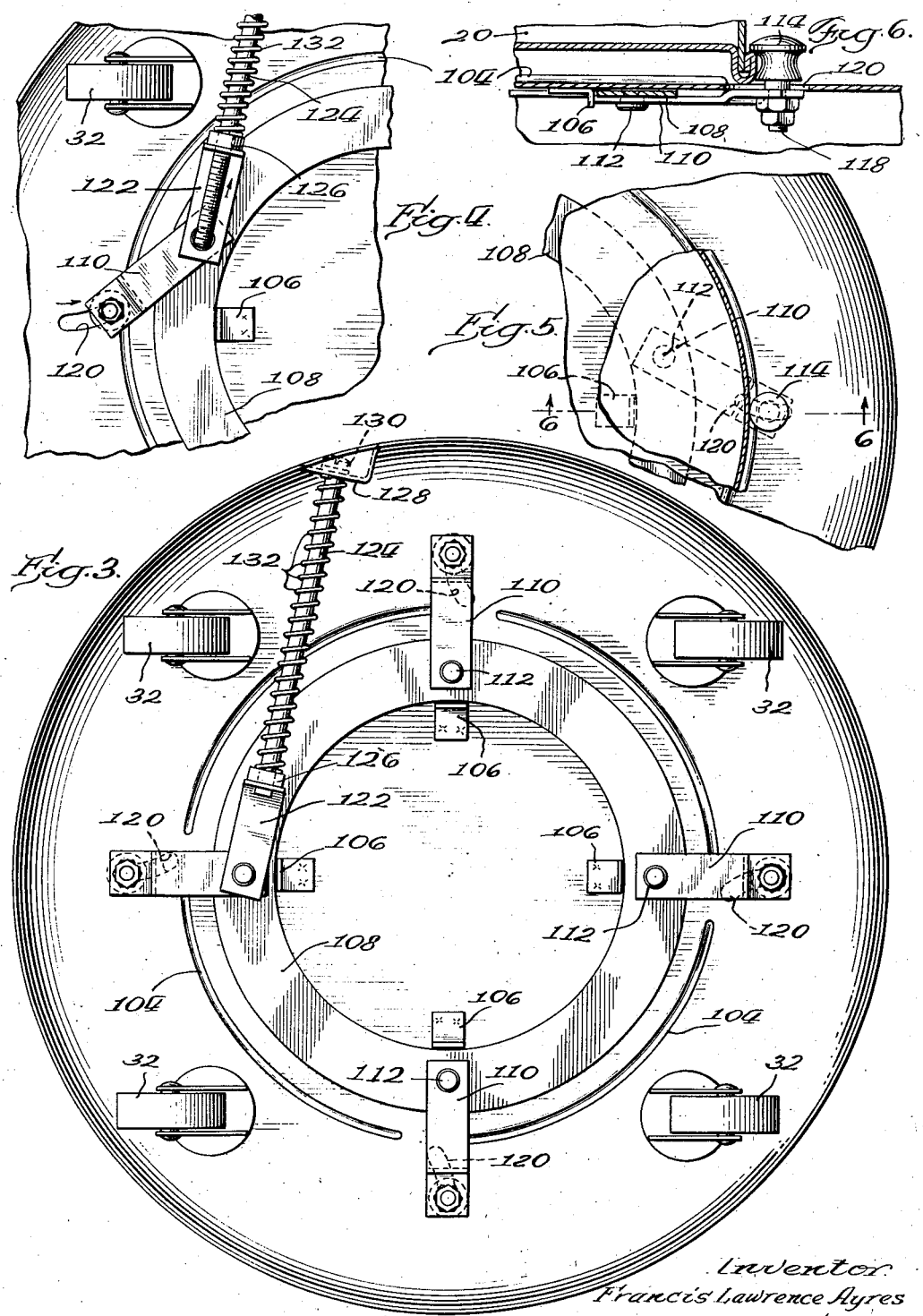
Inventor
Francis Lawrence Ayres
By Williams, Bradbury & Hinkle
Attys.

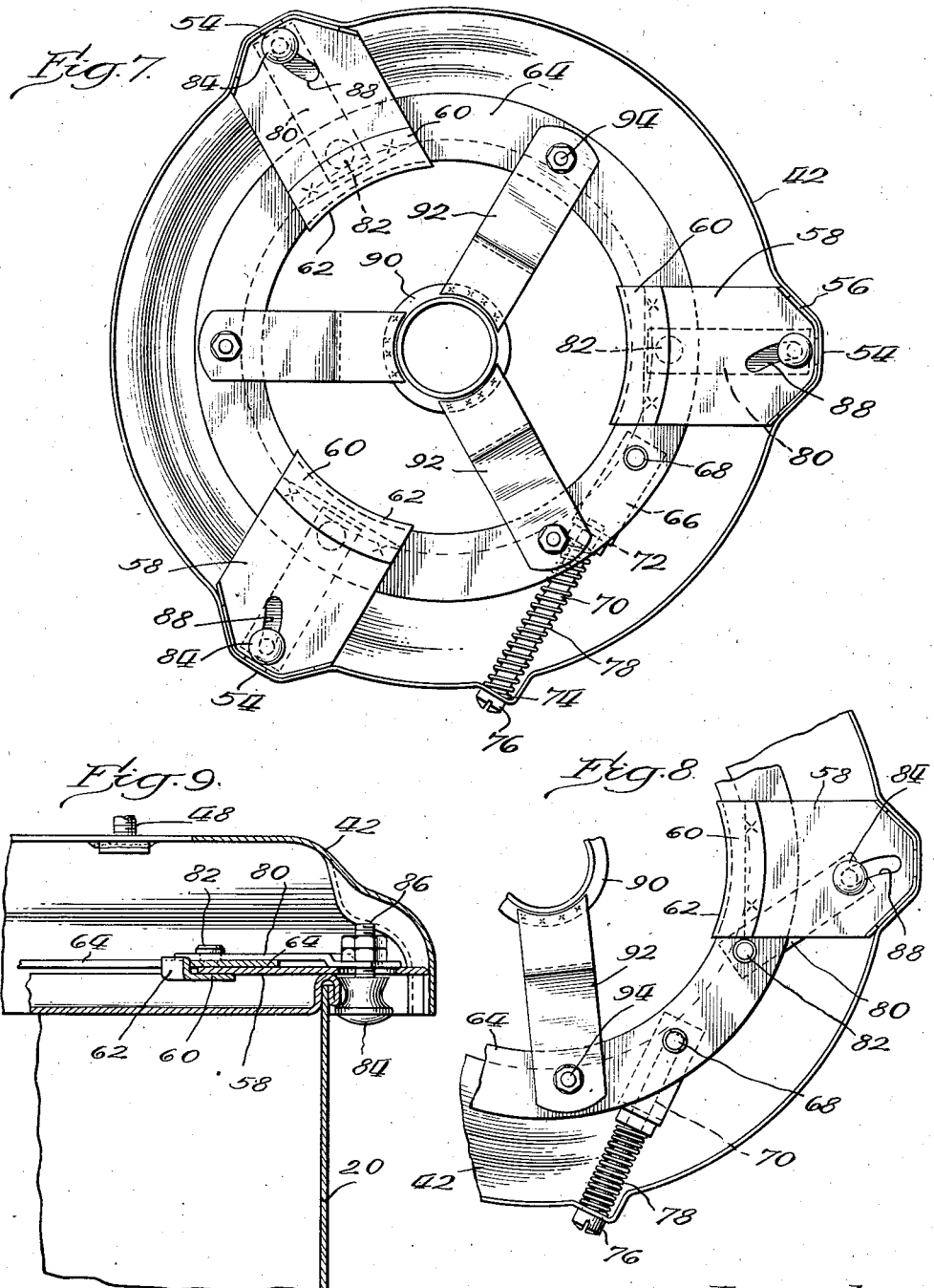

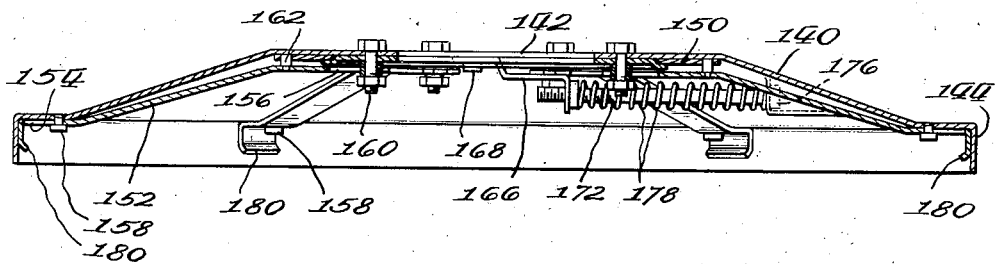
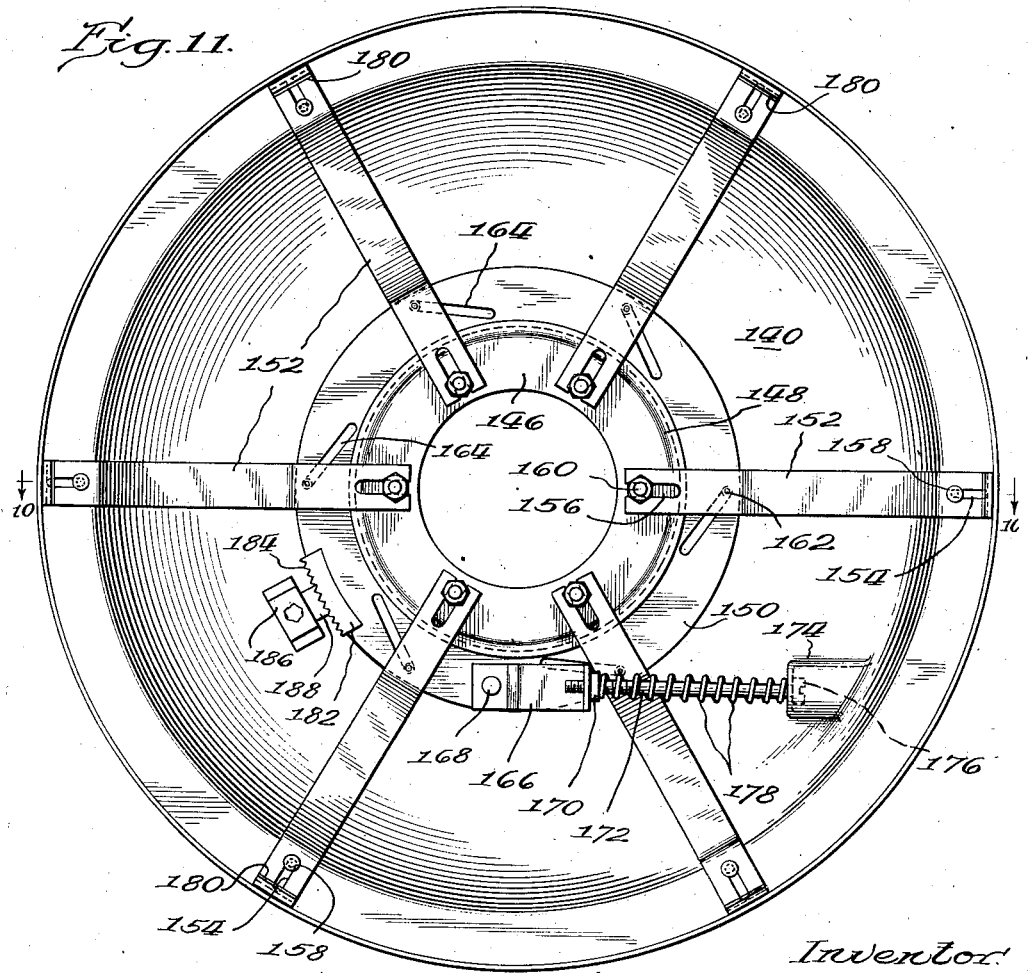

Patented July 25, 1944

2,354,297

UNITED STATES PATENT OFFICE 2,354,297

FASTENING MEANS FOR DETACHABLE COVERS AND OTHER DEVICES

Francis Lawrence Ayres, Des Plaines, Ill., assignor to Stewart-Warner Corporation, Chicago, Ill., a corporation of Virginia Application April 2, 1942, Serial No. 437,351

4 Claims. (Cl. 292—7)

My invention pertains to fastening means for detachable covers and bases for lubricant drums and for other similar devices.

Lubricant of the kind used to lubricate the chassis bearings, transmissions and differentials of automobiles and the bearings and similar parts of other machinery is commonly shipped in drums of various sizes. It has heretofore been common to provide either hand or power operated lubricant compressors which can be applied to these drums without removing the lubricant therefrom and which will pump the lubricant directly from the drum to a bearing or other part to be lubricated. No satisfactory means has heretofore been developed for firmly and quickly attaching the lubricant compressor to the drum of lubricant or for firmly and quickly attaching the lubricant drum to a portable base whereby the assembled compressor and drum can be readily moved from place to place.

An object of my invention is to provide a new and improved fastening means applicable to detachable covers and bases for lubricant drums whereby the lubricant compressor may be quickly and firmly attached to the drum and the assembled drum and compressor may be quickly and firmly attached to a portable base.

Another object of my invention is to provide new and improved fastening means which is inexpensive to manufacture, easy to operate, and capable of general application.

Other objects and advantages of my invention will become apparent as the description proceeds.

In the drawings, Fig. 1 is a side elevation of a lubricant drum provided with my detachable cover for application to a lubricant compressor and my detachable base, whereby the assembled drum and compressor may be readily transported from place to place.

Fig. 3 is a bottom view of the base shown in Figs. 1 and 2.

Fig. 4 is a fragmentary view similar to Fig. 3, but showing the parts in a different position.

Fig. 5 is a partial horizontal section taken on the line 5—5 of Fig. 2.

Fig. 6 is a partial section taken on the line 6—6 of Fig. 5.

Fig. 7 is a bottom view of a cover embodying my invention.

Fig. 8 is a fragmentary view similar to Fig. 7, but showing the parts in a different position.

Fig. 9 is a partial section through the cover and drum showing the manner in which the cover grips the drum.

Fig. 10 is a vertical section through a modified form of cover and Fig. 11 is a bottom view of the cover of Fig. 10.

Figure 1:
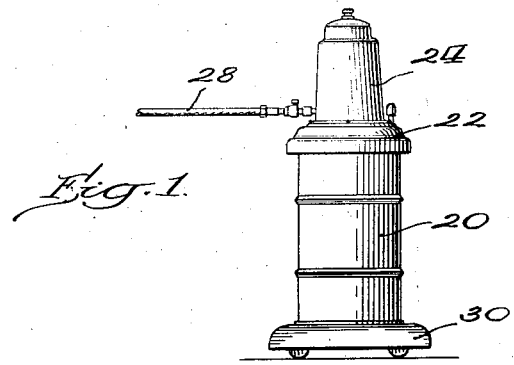
Figure 2:
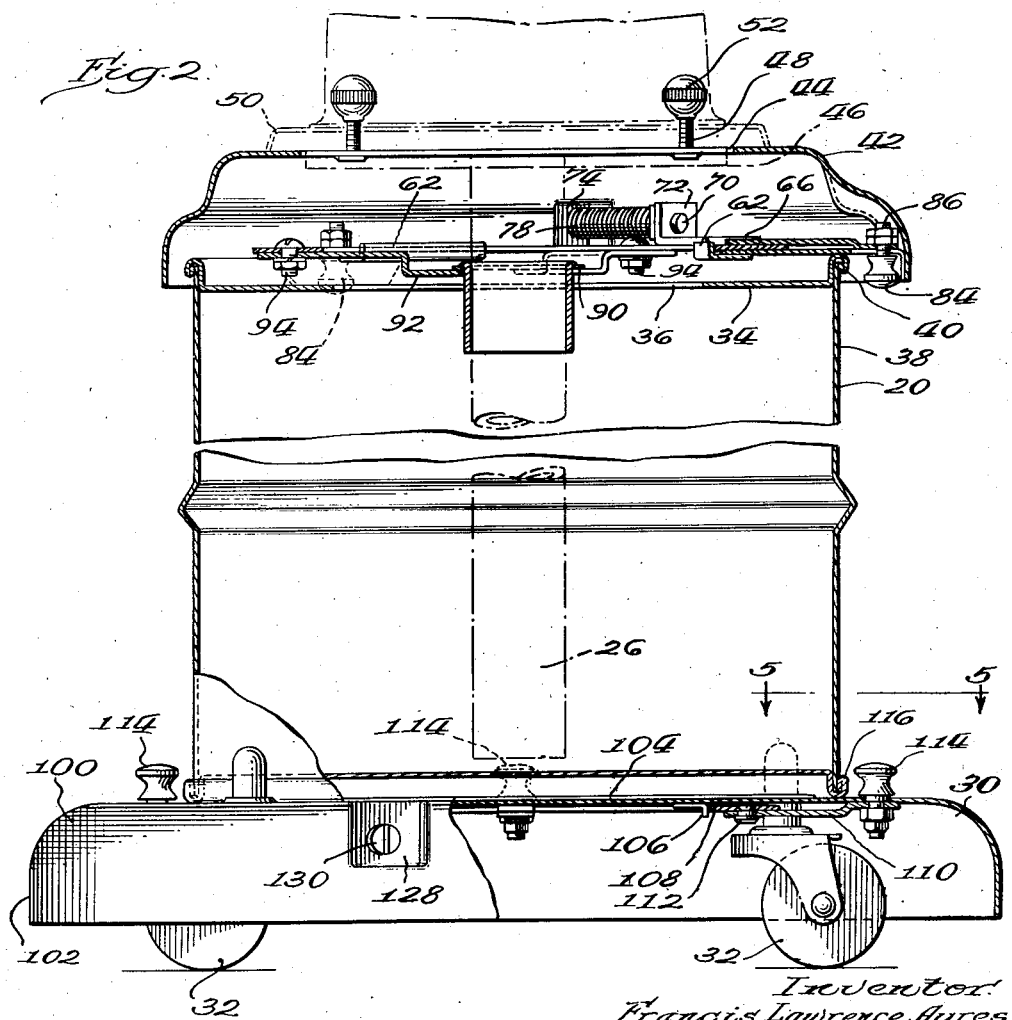
Fig. 2 is an enlarged vertical section through the lower part of Fig. 1.

In Figs. 1 and 2 of the drawings, I have illustrated a lubricant drum 20 as having a cover 22 attached to the upper end thereof and supporting a lubricant compressor 24, having an inlet tube 26 extending down into the drum 20 and terminating adjacent the bottom thereof. The lubricant compressor has a discharge hose 28 which may be provided with any suitable nozzle, coupler or spout and the lubricant compressor itself may be of any desired construction and operated by electricity, compressed air, manual force or in any other suitable manner.

The drum 20 is mounted on a base 30 provided with casters 32, whereby the assembly can be readily moved from one automobile to another, or from machine to machine, whereby the lubrication of the parts may be conducted in the quickest and most efficient manner. If desired, the base 30 may be provided with any suitable handle for facilitating movement of the assembly from point to point.

The drum 20 is provided with a head 34 having a relatively large opening 36 which is closed by a removable cover when the drum is shipped by the lubricant manufacturer. This closure can readily be removed by means of a screw driver or other prying tool. The head 34 overlaps the upper end of the cylindrical wall 38 of the drum and is bent back upon itself to form a bead 40.

My novel cover 22 comprises an annular portion 42, having in the form shown a relatively large opening 44 to receive the depending portion 46 of the lubricant compressor, although it will be understood by those skilled in the art that the opening 44 may be given any suitable denomination for cooperating with a particular lubricant compressor. The annular member 42 is provided with upstanding screws 48, preferably four in number, which pass through suitable openings in the flange 50 provided by the housing of the lubricant compressor 44 or by an attractive hood, which in some instances may be placed over and around the housing of the compressor itself. The flange 50 is securely attached to the cover 22 by nuts 52.

As best shown in Fig. 7, the annular member 42 is bent outwardly at three equally spaced points, as indicated at 54, and at each of these points the downwardly projecting flanges 56 of brackets 58 are welded or otherwise suitably secured to the annular member 42. These brackets 58 rest upon the top of the drum 20 and have guide plates 60 welded or otherwise suitably secured to the inner ends thereof. These guide plates have upstanding flanges 62 which guide the rotary movements of ring 64 which is movably supported on brackets 58.

The means for rotating the ring 64 comprises a drawbar 66 pivotally connected at 68 to the ring 64. A long screw 70 is threaded into the upstanding end 72 of the drawbar 66. The screw 70 extends freely through an opening provided in a bent portion 74 of the annular member 42 and has a kerfed head 76 whereby the screw 70 may be rotated in either direction. A spring 78 surrounds the screw 70 and is confined between the upturned end 72 of the drawbar and bent portion 74 of the annular member 42.

Links 80 are pivoted to ring 64 as indicated at 82 and each of the links 80 carries a depending spool 84 which has a shape something like an hour glass to permit it to engage beneath the bead 40 on the drum 20. The spools 84 have threaded studs 86 which extend through kerfed slots 88 formed in the brackets 58.

When screw 70 is turned in a clockwise direction, the drawbar 66 is pulled toward the bent portion 74 of the annular member 42, causing the ring 64 to rotate and the links 80 to assume the position shown in Fig. 8. This moves the spools 84 inwardly and causes them to engage beneath the bead 40, thereby locking the cover 22 firmly to the upper end of the drum 20. When it is desired to release the cover from the drum, the screw 70 is rotated in a counter-clockwise direction, whereby spring 78 returns the ring 74 and spools 84 to the position shown in Fig. 7. It will be noted that this form of mechanism readily accommodates itself to variations in drum sizes so that the same cover is equally adapted for a variety of drum sizes.

In the form shown in Fig. 7, a collar 90 is connected to ring 64 by arms 92. Inner ends of these arms are welded or otherwise suitably attached to the collar 90 and the outer ends of these arms are illustrated as being connected to the ring 64 by bolts 94. As best shown in Fig. 2, the collar 90 surrounds the depending tube 26 of the lubricant compressor and rotates with ring 64.

The base 30 comprises a sheet metal plate 100, which is illustrated as having a downwardly extending skirt portion 102 to provide an attractive appearance. The plate 100 may be provided with upstanding arcuate ribs 104 which reinforce the base and also facilitate centering of the drum thereon.

Downwardly projecting fingers 106 are punched out of the plate 100 and collectively form an annular track for ring 108. Links 110 are pivoted to ring 108, as indicated at 112, and each link 110 has a spool 114 attached to the outer end thereof. The spools 114 are similar to the spools 84 and are adapted to overlie the upper edge of the lower bead 116 of the drum 20. Each spool 114 has a stud 118 passing downwardly through a kerfed slot 120 formed in the base plate 100.

A drawbar 122 is pivoted to the ring 108 and may be secured thereto by one of the pivots which connects one of the links 110 to this ring. A screw 124 is threaded into the downwardly projecting end 126 of the drawbar 122 and has its other end extending loosely through an opening provided in a bent portion 128 of the skirt 102. This screw is provided with a kerfed head 130 whereby the screw may be rotated in either direction. A spring 132 surrounds the screw 124 and is confined between drawbar 122 of the bent portion 128.

When it is desired to clamp the drum 20 to the base 30, the screw 130 is rotated in a clockwise direction, thereby rotating the ring 108 in a clockwise direction, as viewed in Fig. 3, and drawing the spools 114 into clamping engagement with the bead 116 to firmly grip the attached drum to the base. The gripping position of the links 110 and spools 114 is best shown in Figs. 4, 5 and 6. When it is desired to remove and empty the drum, the screw 124 is rotated in a counter-clockwise direction, whereupon the spring 132 returns the ring 108, links 110 and spools 114 to the position shown in Figs. 2 and 3 and in this position of the parts the drum may be readily removed and replaced by the fresh drum.

In Figs. 10 and 11 I have shown a modified cover which may be used in lieu of the cover previously described. In this embodiment of my invention, the cover comprises an annular member 140, having a central opening 142 for receiving the depending portion of the lubricant compressor and a downwardly extending skirt portion 144 adapted to surround the upper end of the lubricant drum. An annular plate 146 is attached to the member 140 in any suitable manner and has a circular lip 148 which retains the movable ring 150 against the lower side of the member 140.

I provide a plurality of grab hooks 152 and each of these grab hooks is provided with a pair of slots 154 and 156 adapted to cooperate with guide pins 158 and 160 provided on the member 140 and plate 146, respectively. The grab hooks are also provided with pins 162 located in inclined slots 164 formed in ring 150.

Drawbar 166 is pivoted at 168 to ring 150 and has a downwardly extending end 170 threadedly engaging screw 172, whose other end extends through bracket 174 attached to member 140. Screw 172 is provided with a kerfed head 176 whereby the screw may be rotated in either direction and a spring 178 surrounds the screw. Rotation of this screw in a clockwise direction rotates ring 150 and draws the hooks 152 inwardly, causing the unturned ends 180 of these hooks to engage beneath the bead on the upper end of the drum and firmly lock the cover thereto. When it is desired to release the cover from the drum, the screw 172 is rotated in the reverse direction and spring 178 returns the parts to normal position.

The lock plate 182 is firmly attached in any suitable manner to ring 150 and has teeth 184. A lock 186 is attached to cover member 140 and has a bolt 188 provided with suitable teeth for engaging the teeth 184 of the lock plate 182 and locking the ring 150 and grab hooks 152 in drum clamping position. The lock 186 can be controlled by the usual key or by a number combination in any usual manner and such a lock can be applied to the embodiment previously described as well as the embodiments 10 and 11.

It is to be understood that my invention is not limited to the particular embodiments shown and described, but may assume numerous forms and that the scope of my invention is defined by the following claims.

I claim:

1. In a device of the class described, the combination of a plurality of locking members, a rotatable ring, means connecting said locking members to said ring for actuation thereby, a support for the locking members and ring, a drawbar pivotally connected to said ring, and a screw connecting said drawbar to said support, said screw being arranged substantially tangentially to said ring whereby rotation of said screw turns said ring.

2. In a device of the class described, the combination of a member, an annular member rigid with said first member, a ring surrounding said annular member, ring retaining means provided by said annular member, guide pins provided by said members, a plurality of grab hooks, said grab hooks having slots cooperating with said guiding pins, a pin carried by each grab hook, slots provided in said ring and cooperating with said last-named pins to reciprocate said grab hooks upon oscillation of said ring, and means for oscillating said ring.

3. In a device of the class described, the combination of a supporting plate, a ring rotatable relative to said plate, guide means for said ring, a plurality of links pivotally connected to said ring, a pin carried by each of said links, kerfed slots provided in said supporting plate and receiving said pins, gripping means carried by said pins, and means for rotating said ring and moving said gripping means toward each other.

4. In a device of the class described, the combination of a plurality of locking members, a rotatable ring, a housing for the locking members and ring, said housing rendering said ring relatively inaccessible, a draw bar pivotally connected to said ring, and a screw connecting said draw bar to said housing, said screw being arranged substantially tangentially to said ring whereby rotation of said screw turns said ring, said screw also extending through said housing and having a head exterior thereof.

FRANCIS LAWRENCE AYRES.